United States Patent [19]

Newman et al.

[11] Patent Number: 4,763,125
[45] Date of Patent: Aug. 9, 1988

[54] LIGHT ARRAY FOR PROVIDING PASSIVE RENDEZVOUS GUIDANCE BETWEEN CLOSING AIRCRAFT SPACECRAFT AND THE LIKE

[75] Inventors: Frank J. Newman; Robert K. Knapp; Robert J. Davis, all of Wichita, Kans.

[73] Assignee: The Boeing Company, Seattle, Wash.

[21] Appl. No.: 4,745

[22] Filed: Jan. 7, 1987

Related U.S. Application Data

[63] Continuation of Ser. No. 625,111, Jun. 27, 1984.

[51] Int. Cl.⁴ .............................................. G08G 5/00
[52] U.S. Cl. .............................. 340/958; 244/135 A; 340/953; 340/955; 362/62
[58] Field of Search ............... 340/947, 958, 953–956, 340/961, 963, 976, 982, 752, 753, 783, 815.29, 952; 364/460, 461, 432, 434; 362/62, 290, 325, 342; 244/135 A, 161; 73/178 R; 116/200, 209

[56] References Cited

U.S. PATENT DOCUMENTS

| | | | |
|---|---|---|---|
| 2,777,120 | 1/1957 | Madsen | 340/82 |
| 3,032,754 | 5/1962 | Di Pietro | 340/282 |
| 3,138,779 | 6/1964 | Murray, Jr. et al. | 340/955 |
| 3,152,316 | 10/1964 | Baxter et al. | 340/954 |
| 3,821,697 | 6/1974 | Brown | 340/958 |
| 3,873,210 | 3/1975 | Konopka | 340/958 |
| 3,917,196 | 11/1975 | Pond et al. | 244/135 A |
| 3,989,355 | 11/1976 | Wilmer | 340/752 |
| 4,015,235 | 3/1977 | Demaine et al. | 340/958 |
| 4,158,885 | 6/1979 | Neuberger | 340/956 |
| 4,170,767 | 10/1979 | Tanner | 362/62 |
| 4,249,159 | 2/1981 | Stasko | 340/958 |

OTHER PUBLICATIONS

Tom Sherman, 'Airborne Pinball Machine Guides Refueling', Nov. 1960, pp. 150–151.

Primary Examiner—Joseph A. Orsino, Jr.
Assistant Examiner—Brent A. Swarthout
Attorney, Agent, or Firm—Finnegan, Henderson, Farabow, Garrett & Dunner

[57] ABSTRACT

A passive type forward/aft indicator for mounting on an aircraft refueling tanker. The indicator providing the appearance of an ascending liquid thermometer for guiding an aircraft to be refueled. The indicator providing proper longitudinal positioning underneath the tanker. The indicator can be used equally well for space docking and other types of rendezvous missions.

6 Claims, 2 Drawing Sheets

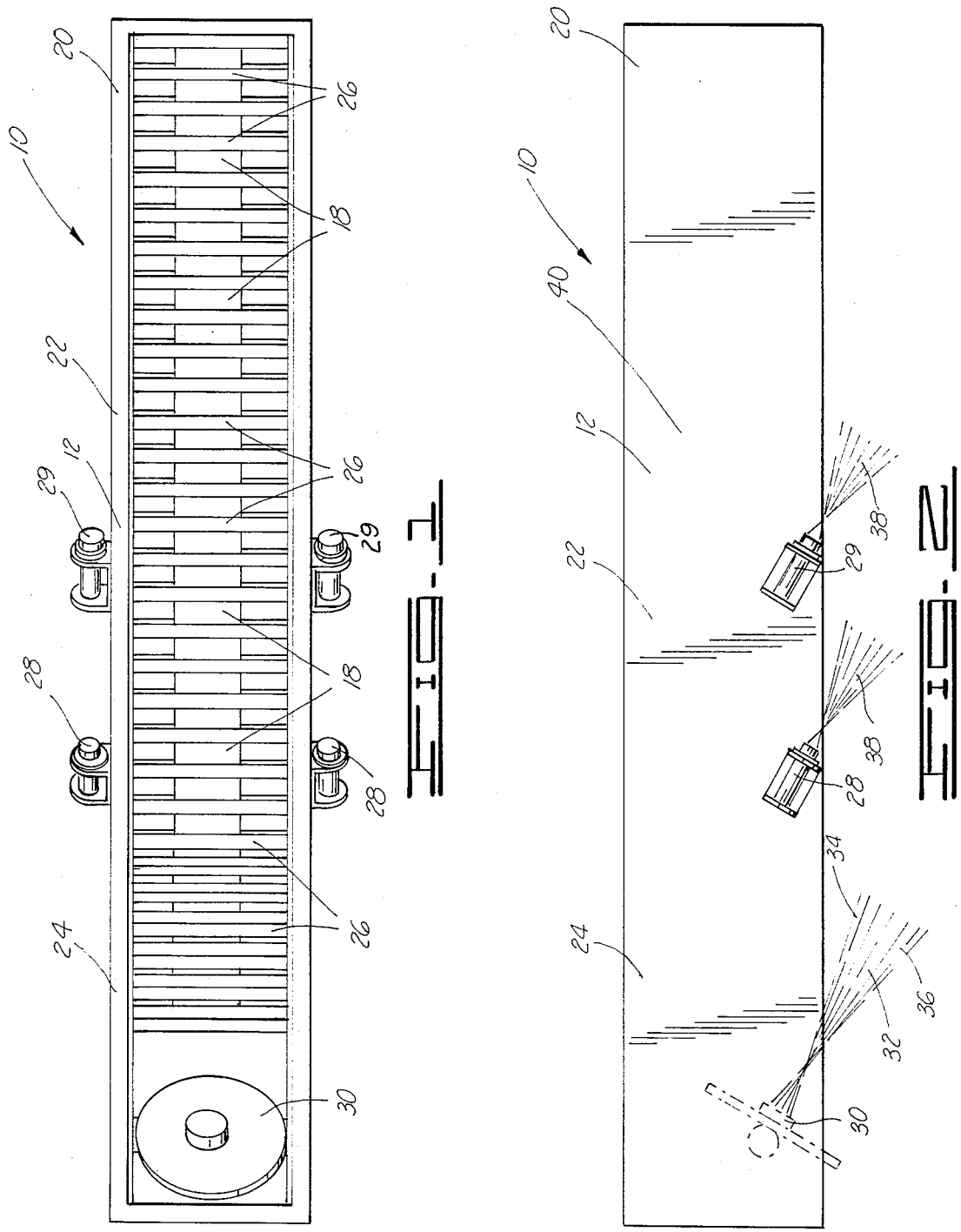

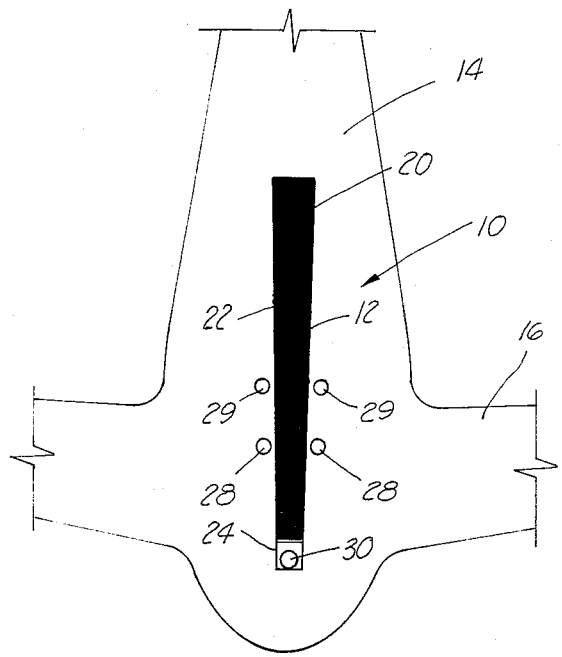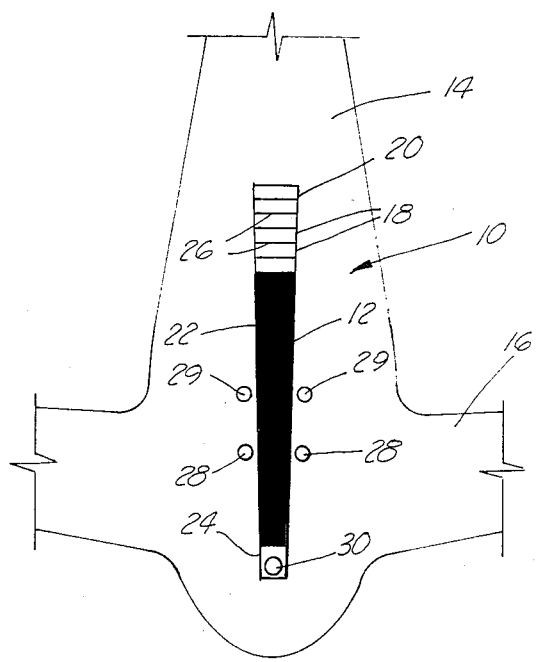
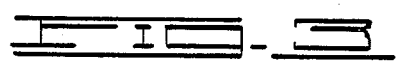 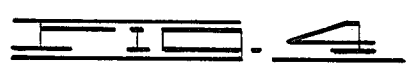
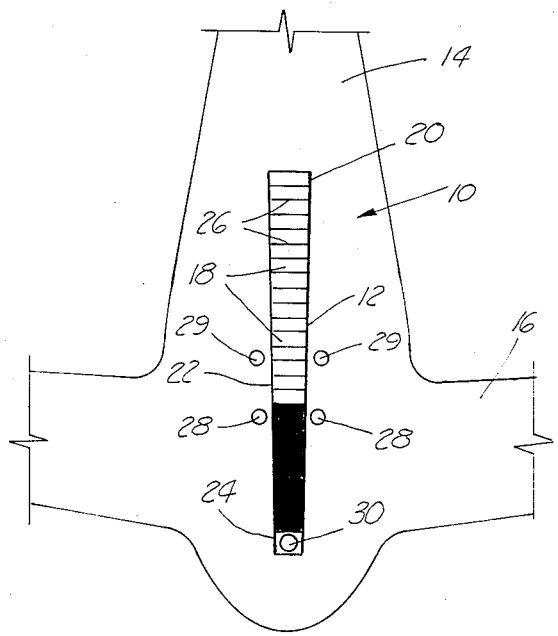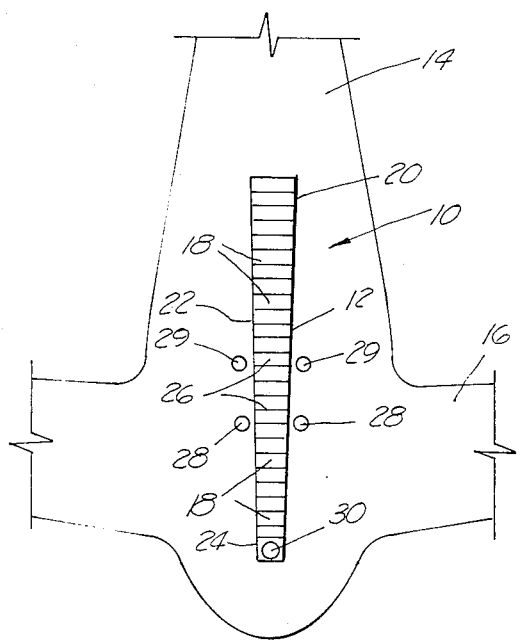
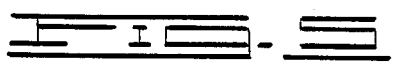 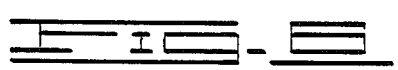

LIGHT ARRAY FOR PROVIDING PASSIVE RENDEZVOUS GUIDANCE BETWEEN CLOSING AIRCRAFT SPACECRAFT AND THE LIKE

This application is a continuation of application Ser. No. 625,111, June 27, 1984.

BACKGROUND OF THE INVENTION

The subject invention provides a forward/aft indicator for an aircraft and more particularly but not by way of limitation for proper positioning underneath a refueling tanker and providing the appearance of an ascending liquid thermometer for guiding the aircraft to be refueled.

In the following U.S. Patents, U.S. Pat. No. 2,777,120 to Madsen, U.S. Pat. No. 3,032,754 to Di Pietro, U.S. Pat. No. 4,170,767 to Tanner and U.S. Pat. No. 4,158,885 to Neuberger an active computer electronic system is described for sequential illumination of tanker aircraft director lights. Also there are various types of disclosures of sequential controlled timing devices for providing a safe standoff between aircraft in the same vicinity. None of the above-mentioned patents disclose the unique features and advantages of a passive type forward/aft indicator as described herein.

SUMMARY OF THE INVENTION

The subject passive type forward/aft indicator includes no moving parts, no computer dependence and no software demands and has minimum electrical power requirements.

The forward/aft indicator is adaptable for light and dark operations and can be installed depending on the choice of light source with minor modifications to the refueling tanker aircraft.

Further, the subject indicator requires no modifications to the receiver aircraft and poses no potential of exposure to the aircrew of radiant energy.

The passive type forward/aft indicator is simple in design, inexpensive and readily adaptable for mounting on different type aircraft. The indicator provides light from a single source through an arrangement of louvers which provide the appearance of an ascending liquid thermometer for guiding the aircraft to be refueled.

Further, the passive type indicator includes a high/low indicator light which is likewise simple in design, inexpensive and includes colored filtered light for indicating proper elevation of the receiver aircraft in relationship to the refueling tanker.

The forward/aft indicator for mounting on an aircraft refueling tanker or similar aircraft includes an elongated housing disposed along the vertical centerline of the tanker fuselage. A light source is mounted in the housing and extends along the length of the housing. A plurality of light blocking louvers are mounted in the housing and disposed in a spaced relationship to each other and extend along the length of the housing. The housing further includes two pairs of command lights mounted on opposite sides of the housing. The command lights, when actuated, indicated the proper longitudinal envelope for the receiver craft being refueled by the refueling tanker.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a bottom view of the forward/aft indicator.

FIG. 2 illustrates a side view of the forward/aft indicator.

FIGS. 3, 4, 5 and 6 show the forward/aft indicator mounted on the belly of an aircraft refueling tanker and illustrates the ascending liquid thermometer appearance of the indicator as an aircraft approaches the tanker to be refueled.

DETAILED DESCRIPTION OF THE DRAWINGS

In FIG. 1 the forward/aft indicator adapted for mounting on the belly of an aircraft refueling tanker or similar aircraft is indicated by general reference numeral 10. The indicator 10 includes an elongated housing 12 which is mounted along the ventral center line of a tanker fuselage 14 of an aircraft 16. The fuselage 14 and aircraft 16 are shown in FIGS. 3 through 6.

A light source 18 is mounted in the housing and extends from an aft end portion 20 along the length of the housing 12, past a middle portion 22 to a forward end portion 24.

The housing 12 includes a plurality of light blocking louvers 26 disposed in a spaced relationship to each other and extending from the aft end portion 20 to the forward end portion 24 of the housing 12. The louvers may be of various types of construction and including light control film having microsized louvers embedded in a plastic substrate.

Two pairs of command lights 28 and 29 are mounted on opposite sides of housing 12 and toward the forward end portion 24. The command lights 28 and 29 are positioned along the length of the housing 12 to provide an aft limit at lights 29 and a forward limit at lights 28 with a proper longitudinal envelope formed therebetween for the receiver craft being refueled.

Mounted in the forward end portion 24 of the housing 12 is a high/low indicator light 30 which provides a light source extending rearwardly toward the aft end portion 20 of the housing 12 as shown in FIG. 2. The high/low indicator light 30 provides a light source which will indicate, for example, a green light source 32 wherein the elevation is in a proper range of the receiver aircraft in relationship to the refueling tanker 16. Should the receiver aircraft be too high a red light source 34 would be illuminated. Likewise if the distance between the two planes is too low a yellow light source 36 would be transmitted from the indicator light 30. The high/low indicator light 30 may be placed in an extendable pod to improve the angular separation from the command lights 28 and 29.

In FIG. 2 a side 40 of the housing 12 can be seen with the command light 28 mounted between the middle portion 22 and the forward end portion 24 with the command light 28 extending a light source 38 downwardly and rearwardly.

In FIG. 3 the indicator 10 can be seen with a dark or opaque appearance since the louvers 26 are completely blocking the light source 18. In FIG. 4 the receiver aircraft has positioned itself closer to the tanker 16 and the aft end portion 20 begins to reveal the light source 18. As the receiver correctly approaches the tanker 16 the light source 18 begins to ascend similar to a liquid thermometer and in FIG. 6 the light source 18 is completely revealed with the command lights 28 and 29 indicating that the receiver aircraft is now in position for refueling from the refueling tanker 16.

Changes may be made in the construction and arrangement of the parts or elements of the embodiments as described herein without departing from the spirit or scope of the invention defined in the following claims.

What is claimed is:

1. A light array for disposition along the ventral centerline of a lead aircraft to provide passive rendezvous guidance to a closing aircraft, said array comprising:

an elongated housing having fore and aft ends and an elongated opening in the bottom thereof extending from the aft end to proximate the fore end;

an elongated light source disposed in said housing along the centerline thereof and extending between the ends of said housing; and light-blocking louver means disposed in said opening for progressively increasing the elongated length of light from said light source visible to said closing aircraft as the longitudinal distance between the lead and closing aircraft decreases.

2. The array of claim 1 also including command reference lights disposed on each side of said housing between said fore and aft ends thereof, said command reference lights being oriented and disposed to indicate visually to said closing aircraft the proper longitudinal relation between said aircraft.

3. The array of claim 1 also including a high/low indicator light disposed proximate the fore end of said housing, said indicator light being oriented and disposed to indicate visually to said closing aircraft the proper vertical relation between said aircraft.

4. The array of claim 1 wherein said louver means comprises a plurality of parallel, longitudinally-spaced, light-blocking louvers mounted on said housing transverse said opening, the spacing between said louvers being greater proximate said aft end than the spacing proximate said fore end.

5. A light array for disposition along the ventral centerline of a lead aircraft to provide passive rendezvous guidance to a closing aircraft, said array comprising:

an elongated housing having fore and aft ends and an elongated opening in the bottom thereof extending from the aft end to proximate the fore end;

an elongated light source disposed in said housing along the centerline thereof and extending between the ends of said housing;

a plurality of parallel, longitudinally-spaced, light-blocking louvers mounted on said housing transverse said opening, the spacing between said louvers being greater proximate said aft end than the spacing proximate said fore end for progressively increasing the elongated length of light from said light source visible to said closing aircraft as the longitudinal distance between the lead and closing aircraft decreases;

command reference lights disposed on each side of said housing between said fore and aft ends thereof, said command reference lights being oriented and disposed to indicate visually to said closing aircraft the proper longitudinal relation between said aircraft; and a high/low indicator light disposed proximate the fore end of said housing, said indicator light being oriented and disposed to indicate visually to said closing aircraft the proper vertical relation between said aircraft.

6. A tanker aircraft for aerial refueling a receiving aircraft, said tanker aircraft comprising:

means along the ventral centerline of said tanker aircraft for continuously projecting an elongated light coincident with said centerline;

means partially blocking said light for passively visually presenting to said receiving aircraft a progressively increasing elongated length of light as the longitudinal distance between said aircraft decreases;

first light means transversely adjacent said elongated light for passively visually indicating to said receiving aircraft the proper longitudinal relation between said aircraft; and second light means disposed at one longitudinal end of said elongated light for passively visually indicating to said receiving aircraft the proper vertical relation between said aircraft.

* * * * *